US012615267B2

(12) United States Patent
Mace et al.

(10) Patent No.:    US 12,615,267 B2
(45) Date of Patent:        Apr. 28, 2026

(54) THUMBPRINTING SECURITY INCIDENTS VIA GRAPH EMBEDDINGS

(71) Applicant: Microsoft Technology Licensing, LLC, Redmond, WA (US)

(72) Inventors: Daniel Lee Mace, Bellevue, WA (US); Andrew White Wicker, Snoqualmie, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 57 days.

(21) Appl. No.: 17/683,266

(22) Filed: Feb. 28, 2022

(65) Prior Publication Data

US 2023/0275908 A1      Aug. 31, 2023

(51) Int. Cl.
H04L 29/06          (2006.01)
H04L 9/40            (2022.01)

(52) U.S. Cl.
CPC ................................ H04L 63/1416 (2013.01)

(58) Field of Classification Search
CPC . H04L 63/1416; H04L 63/1441; H04L 63/20; H04L 63/1433; H04L 29/06578; H04L 12/40104; H04L 67/2853; H04L 112/242; H04L 12/2421; H04L 290/06891; H04L 29/06986; H04L 41/16; G06F 21/552; G06F 21/554; G06F 21/577; G06F 16/244; G06F 16/24573; G06F 1/483; G06F 16/583; G06F 2212/7207; G06F 9/542; G06F 11/3072; G06F 2201/86; G06F 19/24; G06F 19/707; G06F 30/27; G06F 16/38; H01H 85/0078; H03K 19/17768; H04T 2001/221; H04W 28/0925; H04W 12/67; H04W 12/00505; H04W 12/37;
(Continued)

(56) References Cited

U.S. PATENT DOCUMENTS 9,166,997 B1    10/2015    Guo et al.
9,369,484 B1    6/2016    Lacerte
(Continued)

FOREIGN PATENT DOCUMENTS

WO        2017024058 A1      2/2017

OTHER PUBLICATIONS

"Create Protected PDFs from Office Files", Retrieved from: https://support.microsoft.com/en-us/topic/create-protected-pdfs-from-office-files-aba7e367-e482-49e7-b746-a385e48d01e4, Retrieved On: Sep. 19, 2023, 2 Pages.
(Continued)

*Primary Examiner* — Joseph P Hirl
*Assistant Examiner* — Leynna Truvan
(74) *Attorney, Agent, or Firm* — Schwegman Lundberg & Woessner, P.A.

(57)                ABSTRACT

In network security systems, graph-based techniques may be employed to generate "thumbprints" of security incidents, which may thereafter be used, e.g., for threat actor attribution or the identification of similar incidents. In various embodiments, each security incident is represented by a graph in which security events correspond to nodes, and which encodes associated metadata in additional nodes and/or node/edge attributes. Graph representation learning may be used to compute node and/or edge embeddings, which can then be aggregated into the thumbprint of the incident.

19 Claims, 5 Drawing Sheets

(58) Field of Classification Search

CPC ............. H04W 36/0038; H04W 48/00; H04W 12/0027; H05K 1/0275; H04N 21/2541; H04N 13/0066; H04N 13/178; H04N 21/2353; H04M 15/8278; H04M 2215/788; H04M 7/0078; H04M 1/27453; G06N 20/00; G06T 5/60; G06V 10/70; G06G 17/30412; G06Q 20/206; G06Q 20/382; G16Y 30/10; G16Y 40/50; G05B 2219/42006; G05B 2219/2403; G06K 2209/27; G06K 2009/00738; G08G 1/162; G03F 7/706841; G05D 2101/15; Y04S 40/24; Y10S 462/903

See application file for complete search history.

(56) References Cited

U.S. PATENT DOCUMENTS

| | | | |
|---|---|---|---|
| 9,852,231 | B1 | 12/2017 | Ravi et al. |
| 9,898,604 | B2 | 2/2018 | Fang et al. |
| 10,015,186 | B1 | 7/2018 | Tamir |
| 10,263,998 | B1 | 4/2019 | Bhatt et al. |
| 10,333,952 | B2 | 6/2019 | Chen et al. |
| 10,521,584 | B1 | 12/2019 | Sharifi Mehr |
| 10,771,492 | B2 | 9/2020 | Hudis et al. |
| 10,785,237 | B2 | 9/2020 | Mestha |
| 10,798,113 | B2 | 10/2020 | Muddu et al. |
| 10,958,667 | B1 | 3/2021 | Maida et al. |
| 11,032,303 | B1 | 6/2021 | Efstathopoulos et al. |
| 11,218,357 | B1 | 1/2022 | Salinas |
| 11,657,387 | B2 | 5/2023 | Delhoste et al. |
| 2016/0205122 | A1 | 7/2016 | Bassett |
| 2017/0063909 | A1* | 3/2017 | Muddu ................... H04L 63/20 |
| 2017/0302685 | A1 | 10/2017 | Ladnai et al. |
| 2017/0329964 | A1 | 11/2017 | Ikeda |
| 2018/0103052 | A1* | 4/2018 | Choudhury ............. H04L 63/20 |
| 2018/0137155 | A1 | 5/2018 | Majumdar |
| 2018/0157705 | A1 | 6/2018 | Robichaud |
| 2018/0196861 | A1 | 7/2018 | Lee |
| 2018/0329958 | A1 | 11/2018 | Choudhury et al. |
| 2019/0342307 | A1 | 11/2019 | Gamble et al. |
| 2020/0089765 | A1 | 3/2020 | Jayaraman et al. |
| 2020/0134076 | A1 | 4/2020 | Ogrinz |
| 2020/0151326 | A1 | 5/2020 | Patrich |
| 2020/0233864 | A1* | 7/2020 | Jin ........................ G06F 16/288 |
| 2020/0242139 | A1 | 7/2020 | Neels et al. |
| 2020/0304462 | A1 | 9/2020 | Kopp |
| 2020/0374179 | A1 | 11/2020 | Arrabolu et al. |
| 2021/0073285 | A1 | 3/2021 | Hunter |
| 2021/0152581 | A1 | 5/2021 | Hen et al. |
| 2021/0350248 | A1 | 11/2021 | Rogers et al. |
| 2021/0374237 | A1 | 12/2021 | Momeni Milajerdi et al. |
| 2022/0210202 | A1 | 6/2022 | Crabtree |
| 2022/0210220 | A1 | 6/2022 | Shivanna |
| 2022/0224724 | A1 | 7/2022 | Bazalgette |
| 2023/0129144 | A1 | 4/2023 | Neil et al. |
| 2023/0275907 | A1 | 8/2023 | Bertiger et al. |
| 2023/0289438 | A1 | 9/2023 | Silberman et al. |
| 2024/0152622 | A1 | 5/2024 | Xia |
| 2024/0205245 | A1 | 6/2024 | Singhal |
| 2025/0088521 | A1 | 3/2025 | Rahman |

OTHER PUBLICATIONS

"MinHash LSH", Retrieved from: https://ekzhu.com/datasketch/lsh. html, Retrieved On: Sep. 19, 2023, 9 Pages.

"TLSH—A Locality Sensitive Hash", Retrieved from: https://tlsh. org/, Retrieved On: Sep. 19, 2023, 1 Page.

Cheng, et al., "Discovering Attack Scenarios via Intrusion Alert Correlation Using Graph Convolutional Networks", In Journal of IEEE Communications Letters, vol. 25, Issue 5, May 2021, pp. 1564-1567.

"International Search Report and Written Opinion Issued in PCT Application No. PCT/US2023/010903", Mailed Date: May 10, 2023, 14 Pages.

Zhang, et al., "Multi-Step Attack Detection Based on Pre-Trained Hidden Markov Models", In Journal of Sensors, vol. 22, Issue 8, Apr. 8, 2022, pp. 1-18.

"About the D3FEND Knowledge Graph Project", Retrieved from: https://d3fend.mitre.org/about/, Retrieved on: Jan. 12, 2022, 2 Pages.

Davies, et al., "Automated Investigation and Response in Microsoft 365 Defender", Retrieved from: https://docs.microsoft.com/en-us/ microsoft-365/security/defender/m365d-autoir?view=o365-worldwide, Oct. 6, 2021, 4 Pages.

Hamilton, et al., "Inductive Representation Learning on Large Graphs", In Repository of arXiv:1706.02216v4, Sep. 10, 2018, 19 Pages.

Levin, et al., "Security Orchestration, Automation, and Response (SOAR) in Microsoft Sentinel", Retrieved from: https://docs. microsoft.com/en-US/azure/sentinel/automation, Nov. 18, 2021, 3 Pages.

Wang, et al., "Language Models are Open Knowledge Graphs", In Repository of arXiv:2010.11967v1, Oct. 22, 2020, 30 Pages.

Yasunaga, Michihiro, "Reasoning with Language Models and Knowledge Graphs for Question Answering", Retrieved from: http://ai. stanford.edu/blog/qagnn/, Jul. 12, 2021, 5 Pages.

Brown, Tom B., et al., "Language Models are Few-Shot Learners", In Repository of arXiv:2005.14165v4, Jul. 22, 2020, pp. 1-75.

1 "International Search Report and Written Opinion issued in PCT Application No. PCT/US2023/011960", Mailed Date: Apr. 13, 2023, 10 Pages.

Final Office Action mailed on Jun. 10, 2024, in U.S. Appl. No. 17/683,257, 14 pages.

Non-Final Office Action mailed on Feb. 27, 2024, in U.S. Appl. No. 17/683,257, 14 pages.

Non-Final Office Action mailed on Sep. 24, 2024, in U.S. Appl. No. 17/683,257, 14 pages.

Final Office Action mailed on Feb. 5, 2025, in U.S. Appl. No. 17/683,257, 15 pages.

Non-Final Office Action mailed on Jun. 11, 2025, in U.S. Appl. No. 18/400,987, 26 Pages.

Final Office Action mailed on Nov. 3, 2025, in U.S. Appl. No. 18/400,987, 32 Pages.

* cited by examiner

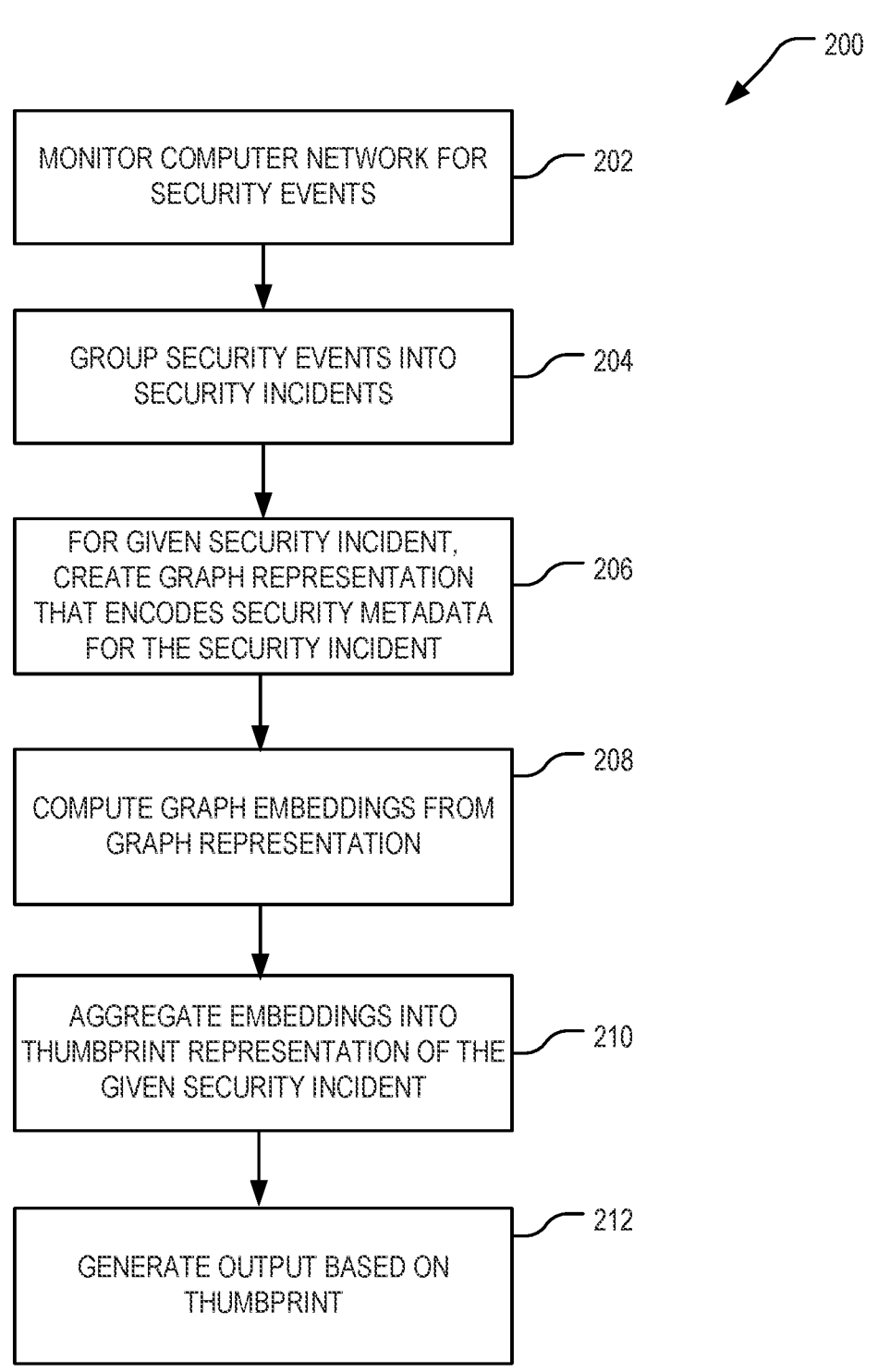

200

202 — MONITOR COMPUTER NETWORK FOR SECURITY EVENTS

204 — GROUP SECURITY EVENTS INTO SECURITY INCIDENTS

206 — FOR GIVEN SECURITY INCIDENT, CREATE GRAPH REPRESENTATION THAT ENCODES SECURITY METADATA FOR THE SECURITY INCIDENT

208 — COMPUTE GRAPH EMBEDDINGS FROM GRAPH REPRESENTATION

210 — AGGREGATE EMBEDDINGS INTO THUMBPRINT REPRESENTATION OF THE GIVEN SECURITY INCIDENT

212 — GENERATE OUTPUT BASED ON THUMBPRINT

FIG. 2

THUMBPRINTING SECURITY INCIDENTS VIA GRAPH EMBEDDINGS

BACKGROUND

Commercial enterprises and other organizations that operate large computer networks typically employ a number of hardware- or software-based network security tools to monitor network communications and guard against cybersecurity threats. These network security tools, which may include, e.g., firewalls, anti-malware software, access controls, intrusion prevention systems, network anomaly detectors, email security, and the like, usually generate security alerts when triggered by anomalous or otherwise suspicious activity. Logs of such security alerts, often aggregated over the various tools, can be reviewed by network security analysts or administrators, who then assess whether a security threat is indeed present and take appropriate action. As the number of alerts can be far in excess of the amount that human network security administrators can handle—e.g., running into the tens or hundreds of thousands or even millions per day for a sizable organization—a network security solution may involve some form of clustering or grouping of the alerts, e.g., based on similarity between their attributes, into security incidents each deemed to correspond to a single cyberattack that affects many machines, users, applications, transactions, etc. In addition, human action on security incidents or alerts may be augmented with, or in some cases even obviated by, automated machine action taken to mitigate threats. Even with aggregation of alerts into far fewer incidents, however, the number of incidents (e.g., in the hundreds or thousands per day) may still consume substantial machine resources and/or be overwhelming to human analysts. In addition, the security incidents may include many false positives that unnecessarily trigger machine action and/or distract analysts from the true threats, rendering the network vulnerable to attacks.

BRIEF DESCRIPTION OF DRAWINGS

FIG. 2 is a flowchart of an example method of generating graph-based thumbprint representations of security incidents, in accordance with various embodiments.

DESCRIPTION

Described herein are systems and methods for analyzing security incidents based on graph representations in a manner that allows leveraging contextual data and/or knowledge about previous security incidents or known threat patterns, providing rich information that can aid security analysts in their investigations of and response to incidents as well as facilitate automation of security measures. In various embodiments, individual security incidents are each represented as a graph whose nodes represent security events that collectively make up the incident, entities associated with the events, insights about the security incident as a whole, and/or other metadata pertaining to the security incident. Graph representation learning techniques, e.g., utilizing neural networks, are then used to generate fixed-length vector representations, referred to as "graph embeddings" (or simply "embeddings") of the nodes and/or edges of the graph. From these embeddings, a thumbprint representation (or "thumbprint" for short) of the incident as a whole can be generated. The thumbprints may be used, in some embodiments, to attribute incidents to known threat actors or threat campaigns or to group incidents based on similarity, providing guidance for further investigation, selection of mitigating actions, and/or setting of policies, as well as enabling bulk operations to be applied to entire classes of incidents. Further, at the level of individual nodes and edges, the embeddings may be used to expand the graph of an incident with additional nodes and/or edges that reflect, e.g., relevant context and predicted relations, as well as to identify subgraphs associated, e.g., with different phases of a threat. The following description explains these and further features and applications in more detail with reference to the accompanying drawings.

Figure 1:
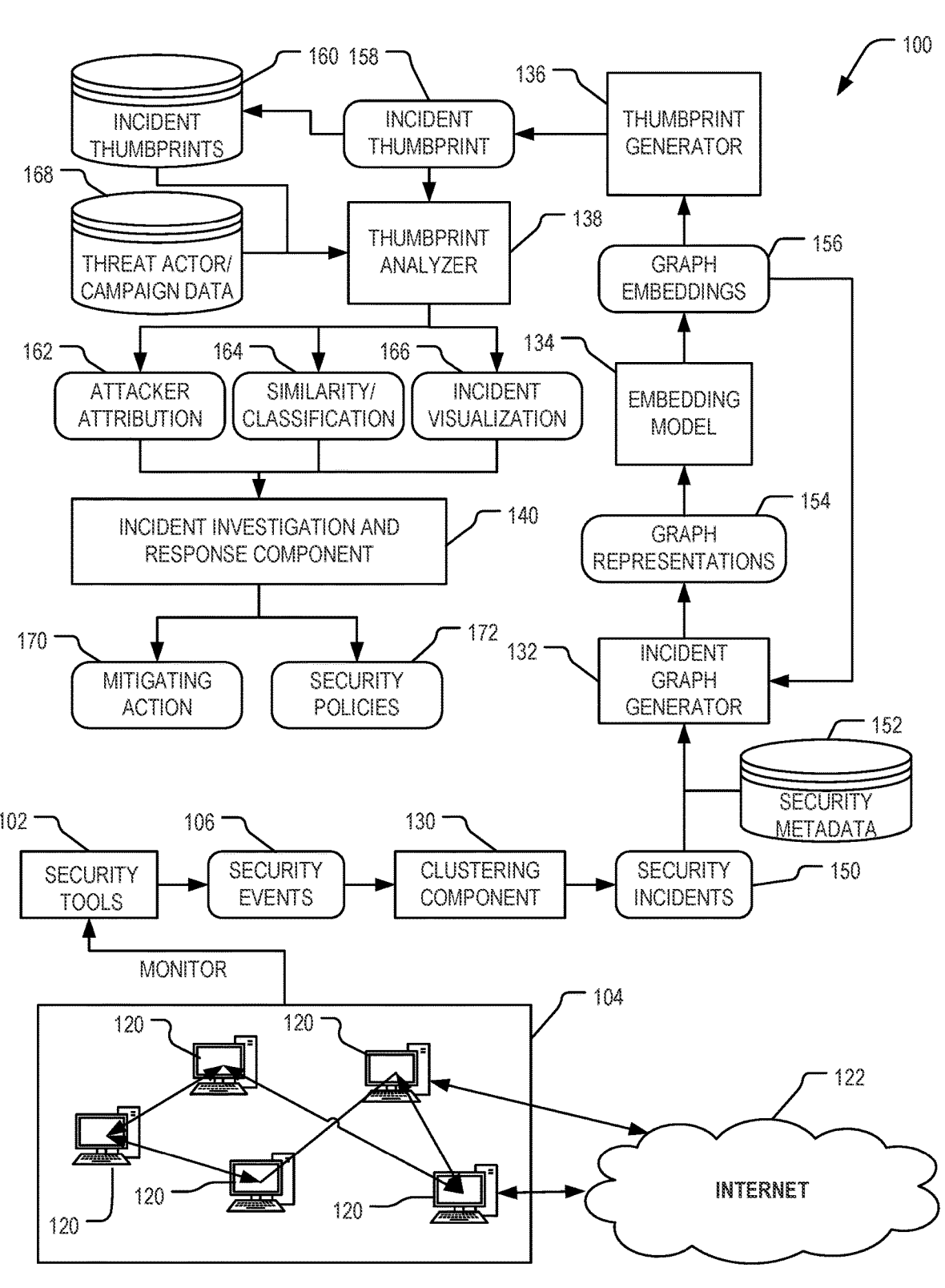
FIG. 1 is a block diagram of an example network security system for monitoring and processing security incidents, in accordance with an embodiment.

FIG. 1 is a block diagram of an example network security system 100 for monitoring and processing security incidents, in accordance with an embodiment. The system 100 includes one or more network security tools 102 that monitor the communications and activities within a computer network 104, and generate time-stamped records of security events 106. The term "security events" is herein broadly understood to encompass any observed event within the network (e.g., network communications, machine accesses by users or other machines, program launches, etc.) that is deemed relevant to assessing network security in the particular application, e.g., according to some defined set of security events or some applied definition. Security events generally include, but are not necessarily limited to, the kinds of unusual or suspicious observed network events that trigger security alerts within a production environment, or non-production alerts (also known as "traps") within a test environment; these alerts constitute examples of security-event records in accordance herewith. In various embodiments, security events also include events that, even if they do not rise to the level of an immediate threat, are noteworthy to security analysts, such as telemetry events (triggered when certain observed network metrics reach specified values or thresholds) or anomalies in network behavior (whether benign or malicious).

The computer network 104 includes multiple (e.g., often a large number of) computing machines 120; which can be accessed by users, store files, execute programs, and communicate with each other as well as with machines outside the organization via suitable wired or wireless network connections. In some embodiments, internal communications within the computer network 104 take place via a local area network (LAN) implemented, e.g., by Ethernet or Wi-Fi, or via a private wide area network (WAN) implemented, e.g., via optical fiber or circuit-switched telephone lines. External communications may be facilitated via the Internet 122. The computing machines 120 within the computer network 104 may include, e.g., servers, desktop or laptop computers, mobile devices (e.g.; smartphones, tablets, personal digital assistants (PDAs)), Internet-of-things devices, etc. The computer network 104 may be dynamic in that it includes, in addition to computing machines that are permanent parts of the computer network 104 (e.g., servers), also computing machines that are only temporarily connected to the computer network 104 at a given time (e.g., if a member of an organization, such as an employee of a company, accesses the intranet of the organization from outside the office via a personal device, such as a smartphone). The computing devices 120 may each include one or more (e.g., general-purpose) processors and associated memory; an example computing machine is described in more detail below with reference to FIG. 4.

To protect the computer network 104 from unauthorized access, data theft, malware attacks, or other cyberattacks, the network 104 is monitored, as noted above, by a number of network security tools 102, which may be implemented as software tools running on general-purpose computing hardware (e.g., any of the computing machines 120 within the computer network 104) and/or dedicated, special-purpose hardware security appliances. Non-limiting examples of security tools that may be utilized in the security system 100 include: one or more firewalls that monitor and control network traffic, e.g., via packet filtering according to predetermined rules, establishing a barrier between the computer network 104 and the Internet 122, and optionally between various sub-networks of the computer network 104; anti-malware software to detect and prevent and/or remove malware such as computer viruses, worms, Trojan horses, ransomware, spyware, etc.; intrusion detection and prevention systems that scan network traffic to identify and block attacks (e.g., by comparing network activity against known attack signatures); network anomaly detectors to spot malicious network behavior; authentication and authorization systems to identify users (e.g., by multi-factor authentication) and implement access controls; application security tools to find and fix vulnerabilities in software applications; email security tools to detect and block email-born threats like malware, phishing attempts, and spam; data loss prevention software to detect and prevent data breaches by monitoring sensitive data in storage, in network traffic, and in use; and/or endpoint protection systems, which employ a combination of measures to safeguard data and processes associated with the individual computing machines 120 serving as entry points into the computer network 104. These tools 102 generate security-event records, e.g., issue security alerts, responsive to detected security events 106.

In some embodiments, comprehensive protection is provided by multiple security, tools bundled into an integrated security suite. Sometimes, multiple such integrated security suites from different vendors are even used in combination for complementary protection. Security solutions may employ "security information and events management (SIEM)" to collect, analyze, and report security-event records across the different security products (e.g., different security tools or integrated security suites), e.g., to provide security analysts with aggregate information in a console view or other unified format. Further, to meet the growing complexity and sophistication of cyberattacks, a more recently developed approach that has come to be known in the art as "extended detection and response (XDR)" may perform intelligent automated analysis and correlation of security-event records across security layers (e.g., email, endpoint, server, cloud, network) to discern cyberattacks even in situations where they would be difficult to detect with individual security tools or SIEM. One nonlimiting example of an XDR product is Microsoft 365 Defender.

The security system 100 further includes a number of processing components (e.g., as shown, components 130, 132, 134, 136, 138, 140) that act on the security events 106 and their associated attributes, which may include, e.g., the event types or severity and the entities (machines, users, applications, files, IP addresses, domains, etc.) involved in the underlying security events. The processing components may be implemented (e.g., as part of or in conjunction with an SIEM or XDR product) in software running on general-purpose computing hardware (e.g., any of the computing machines 120 within the computer network 104), optionally aided by hardware accelerators (e.g., graphic processing units (GPU), field-programmable gate array (FPGA) or application-specific integrated circuit (ASIC)) configured for certain computationally expensive, but repetitive processing tasks.

Event processing may involve grouping security events 106 into security incidents 150 each corresponding to a collection of events 106 that appear to relate to the same cyberattack and should, accordingly, be treated as a group. For example, a malware attack may be carried out through a malicious email attachment sent to multiple users, and these email, along with any user action to save or execute the attachment as well as any network activities that result from such execution may constitute a collection of individual security events that all belong to a single incident. As another example, a cyberattack generally proceeds through a sequence of stages in the "cyber kill chain," which may include, for example: reconnaissance, initial access or infiltration, lateral movement through the network, and ultimately exfiltration (e.g., transfer of sensitive or otherwise valuable data to the attacker at a destination outside the network), weaponization and exploitation (e.g., the creation of a malware payload and triggering of the malware code once delivered), command and control (e.g., communications with the attacker outside the network that indirectly provide full control access within the network) and/or other means of data theft, data destruction, sabotage via viruses, or other harm. Along the kill chain, multiple different types of actions may take place and affect multiple machines, users, applications, data repositories, and so on. The security events 106 at the various stages of an attack may all be aggregated into a single incident 150. In addition to cutting down on the number of items to be reviewed, clustering security events 106 into security incidents 150 provides humans (e.g., security analysts) and automated mitigation tools alike with a more holistic view of the attack, and thus the potential ability to respond more comprehensively and appropriately.

The clustering of security events 106 into security incidents, e.g., by a clustering component 130, is generally based on "correlations," e.g., in terms of shared attributes, between the events 106, and may be accomplished in various ways. Events 106 may, for instance, be grouped together based on a set of heuristic rules that capture commonalities or patterns expected for the events 106 associated with a given attack, such as a common message text between multiple emails, or a certain sequence of actions carried out when a given item of malware is executed. Alternatively or additionally, the events 106 may be computationally represented as the nodes of a graph, with edges corresponding to shared attributes (e.g., the same affected machine or user) or similar relationships (e.g., a network communication that triggered both alerts) between any pair of nodes, and a clustering algorithm may then operate on the graph to identify clusters of events 106, where the clusters are generally characterized by higher connectivity between nodes within each cluster as compared to the connectivity between different clusters (or, in some embodiments, where a cluster contains all events 106 that are in some connected component of the graph). Security events 106 may be clustered in batches (e.g., corresponding to certain time windows during which the events have been collected), or on an ongoing basis using continuous or periodic updates to an existing set of clusters, or with some combination of both. The clustering component 130 may also be or include one or more statistical models and/or machine-learning models, which may be trained and/or retrained, e.g., using feedback from a security analysts. Suitable clustering algorithms and machine-learning models (including methods of training them) are known to those of ordinary skill in the art.

Operating on the security incidents 150 and associated security metadata 152, an incident graph generator 132 generates a graph representation 154 (herein also simply "graph") of each incident 150, in which the individual security events 106 making up the incident 150 are represented as nodes. In accordance with various embodiments, the graph representation 154 encodes, as node and/or edge attributes or separate classes of nodes (or a combination of both), the security metadata 152 associated with an incident 150. The security metadata 152 may include attributes of the individual security events 106, such as event titles, severity scores, or the involved network entities (e.g., machines, users, programs, files, web domains, network addresses, etc.), as may be captured, e.g., by the security tools 102 and stored as part of the security-event records. Alternatively or additionally, the security metadata 152 may include information and insights derived from multiple security events 106 in conjunction or from the incident 150 as a whole, such as an identification of the particular security event(s) 106 that constituted the "seed" which started the incident 150, or weightings that capture the relative importance or interest associated with different security events. Such insights are often learned "behind the scenes," e.g., by security analysts who take a holistic view of the available data and are guided by their experience, or by machine-learning or other automated processes, and may be captured, e.g., in the form of annotations to incidents 150 or the events 106 therein. In generating insights about incidents 150, security analysts and machine-learning models may generally utilize both information generated by the security system 100 itself and information obtained from external sources. Relevant information may include, e.g., lists of known threat actors, campaigns, or command and control (C2) servers, a determination which of them is responsible for a given incident 150, or a delineation of a botnet of infected machines within the monitored network 104 subject to a C2 attack.

In some embodiments, entities, insights, and other metadata are incorporated into the graph representation 154 as distinct types of nodes, e.g., connected to nodes representing the security events 106 with which they are associated. For example, a node representing an entity (e.g., machine or user) involved in a security event 106 may be connected to the node representing that event 106; a node representing the seed of the incident may be connected to a node or nodes representing one or more security events 106 that occurred at the start of the incident; and nodes representing weights, or an indication of importance, may be connected to the security-event nodes to which they pertain. Further, metadata about the relationship between a pair of security events 106, or between a pair of entities or other information represented as nodes in the graph, may also be incorporated into the graph as an additional node acting as a "bridge node" between the pair.

Alternatively or additionally to incorporating nodes of distinct types, the graph representation 154 may also encode security metadata 152 in the form of attributes; e.g., organized in attribute vectors, assigned to the nodes and/or the edges. For example, an attribute vector assigned to a security event 106 may specify the type or title of the event; the involved entity or entities, the associated stage within the cyber kill chain, the time of the event, a severity score assigned to the event 106, etc. To the extent security-event attributes, such as entities, are themselves nodes within the graph, these nodes, too, may be assigned attribute vectors capturing part of the metadata. To provide just a few examples, attributes associated with a machine may include an alert history, the machine type (e.g., server, workstation), and/or the number of users that regularly connect to the machine; attributes associated with users may include user privileges or security group memberships, the user account age, and/or the number of distinct machines logged onto within a certain time period; and attributes associated with IP addresses or domains may include, e.g., the associated port, protocol, packet size, time of registration, owner or administrator information, average daily traffic over a specified time, and/or recent reputation in crowd-sourced intelligence. Furthermore, the edges between two nodes may reflect metadata about the relationship between the nodes. For instance, attributes associated with the relationship between a user and a machine may include the logon type (e.g., remote, hands-on-keyboard, automated, etc.) and/or whether the user is a network administrator.

As will be appreciated by those of ordinary skill in the art, whether a certain item of metadata is incorporated into the graph representation 154 in the form of a separate node or as node or edge attribute is generally a matter of design choice. For example, bridge nodes as described above and edge attributes may be interchangeable. Some attributes may warrant a separate node category, whereas others may lend themselves more to encoding as node or edge attributes. While graphs that encode metadata purely with additional node categories or purely as node and edge attribute vectors are possible, many embodiments will utilize some combination of both. Those of ordinary skill in the art will further appreciate that, depending on the types of nodes present in the graph, edges may be formed in different ways. In graphs that include only security-event nodes, edges may be created between pairs of nodes that are correlated in terms of their attributes, e.g., such that two security events involving the same machine are connected. In graphs that include nodes for security events as well as entities or other items of information, edges may be formed between pairs of nodes of two different types. For example, nodes representing security events 106 may be connected to nodes representing the respective involved entities (e.g., machine and user), nodes representing users may be connected to nodes representing the respective machines accessed by the users, nodes representing machines may be connected to nodes representing the respective application programs they execute, etc. In some embodiments, the edges are limited to pairs of nodes of two different types, resulting in multipartite graphs. In other embodiments, edges between nodes of the same type, such as between two machines or between two alerts, are also possible.

The processing components of security system 100 further include an embedding model 134, such as, e.g., a graph neural network, to generate fixed-length vector representations of the nodes and/or edges of the graph, herein also referred to as "graph embeddings" or simply "embeddings" 156. Further, the processing components may include a thumbprint generator 136 to combine the graph embeddings in some manner to create an incident thumbprint 158 that represents the incident as a whole. The incident thumbprints 158, and optionally the individual node and edge embeddings of the incident, may be stored in computer memory, e.g., in an incident thumbprint database 160, forming a library for subsequent look-up.

Further, a thumbprint analyzer 138 may process the thumbprint 158 of a given security incident 150 to generate and provide further (e.g., high-level) information or insights about the incident 150, such as, e.g., attacker attributions 162, identification of similar prior incidents or incident classifications 164, or incident visualizations 166. For example, as shown, the thumbprint analyzer 138 may have access to a database 168 of known threat actors or threat campaigns. That database 168 may store threat actor/campaign features (e.g., thumbprints similar to those computed for the security incidents) against which the incident thumbprint 158 in question can be compared, e.g., using a contrastive loss model or feature difference model, to attribute the respective incident 150 to the threat actor or campaign that its thumbprint matches (or matches most closely). The thumbprint analyzer 138 may also search the thumbprint database 160 for prior security incidents that are similar to a given incident in question, or process a large number of security incidents to group them by similarity, thereby creating incident classifications. Further, the thumbprint analyzer 138 may create a visualization 166 of incidents in a graphical user interface, e.g., by mapping the thumbprints 158 onto a lower-dimensional space.

The information and insights output by the thumbprint analyzer 138 (which may include, but are not limited to attacker attribution 162, similar incidents and classifications 164, and incident visualizations 166) may flow as input into an investigation and response component 140, which can initiate one or more mitigating actions 170 responsive to a specific incident or group of incidents and/or set or adjust a security policy 172 that will be applied to security incidents of a specified type or class moving forward. The mitigation action(s) 170 and security policy 172 may be caused automatically, or based in part on input provided by a security analyst aided, e.g., by the output of the thumbprint analyzer 138. Mitigating actions 170 and security policies 172 may include, for example and without limitation: suspending network accounts, requiting that users reset their passwords or otherwise causing authentication credentials to be reset, isolating affected machines, performing scans for viruses and other malware, de-installing identified malware, removing persistence mechanisms (e.g., registry entries, scheduled tasks, etc.) associated with the attack, sending warnings (e.g., about phishing attacks or email attachments containing malware) to network users, backing up valuable information, restoring destroyed data from back-up copies, taking stock of exfiltrated data that might include customer information or trade secrets, fixing security bugs, increasing the level of network traffic monitoring, notifying authorities, etc. The implementation of some of these actions 170 and policies 172 may be accomplished, e.g., using the security tools 102.

FIG. 2 is a flowchart of an example method 200 of generating graph-based thumbprint representations 158 of security incidents 150, in accordance with various embodiments. Beginning with monitoring a computer network 104 for security events 106 (operation 202), the method 200 involves grouping the security events 106 into security incidents 150 based on correlations between their attributes (operation 204). As noted above, such grouping, or clustering, may utilize, for instance, heuristic rules, or clustering techniques applied to a graph in which the security events 106 are represented as nodes and nodes corresponding to events 106 that are correlated in at least one attribute are connected by edges. Once a group of correlated security events 106 that collectively constitute a security incident 150 has been determined, a graph representation 154 of the incident 150 is generated from the constituent security events 106 and security metadata 152 associated with the incident 150, including metadata for the individual events 106, relationships therebetween, subsets of the events 106, and/or the incident 150 as a whole (operation 206).

In various embodiments, the graph representation 154 includes, in addition to nodes representing the security events 106 themselves, also nodes representing the security metadata, such as, e.g., nodes representing entities involved in the security events and/or nodes representing insights associated with the security incident (such as the seed of an incident 150 or rankings associated with security events 106). Further, the nodes in the graph representation may have associated attribute vectors that encode metadata associated with respective security events, entities, or other types of nodes. To accommodate nodes of different types, each with its own associated set of attributes, yet achieve attribute vectors of a common fixed length for all nodes within the graph 154, the attribute vectors may be a concatenation of attribute vectors of the individual node types, with values for any attributes not applicable to a given node being set to zero. For example, in a graph including event nodes and entity nodes, attributed by attribute vectors including eight event attributes and ten entity attributes, the last ten attribute values of each event node and the first eight attribute values of each entity node would be zero. In addition to the nodes, the edges may also have associated attribute vectors. In some embodiments, the graph representation 154 includes only event nodes, and the security metadata is reflected in the node and/or edge attributes.

In operation 208, graph embeddings 156 of the nodes (or "node embeddings") are computed from the graph 154 with a suitable embedding model 134, e.g., corresponding to the encoder within the encoder-decoder framework of a graph representation learning technique. The embedding model 134 maps the nodes onto fixed-length vector representations, which are typically low-dimensional as compared with the attribute vectors of the nodes. The embedding model 134 may be configured, e.g., as a result of model training, to preserve neighborhood similarity, meaning that two nodes whose local neighborhoods are similar in graph structure and attributes map onto embeddings whose mutual distance is small, or equivalently, whose similarity is high (as measured by some suitable distance or similarity metric, such as the Cartesian distance between the embedding vectors in the embedding space or the cosine similarity between the embedding vectors). Various graph representation learning approaches that may be employed to generate the node embeddings are known to those of ordinary skill in the art, and include, e.g., factorization-based approaches (e.g., Laplacian eigenmaps and inner-product methods), random walk embedding methods (e.g., DeepWalk and node2vec, large-scale information network embeddings (LINE)), graph neural networks (GNNs), and neighborhood aggregation and convolutional encoders like graph convolutional networks (GCNs) and the GraphSAGE (SAmple and aggreGatE) algorithm.

In some embodiments, GraphSAGE (e.g., heterogeneous GraphSAGE) is used to generate the node embeddings. GraphSAGE iteratively aggregates attribute vectors of nodes within the local neighborhood of a given node into a graph embedding for that node, and is as such particularly suited for use with graph representations 154 that encode security metadata at least in part in node attributes. (Note that GraphSAGE can, in principle, also be applied to graphs without node attributes, using instead features implicit in the graph structure, such as node degrees.) In brief, GraphSAGE initializes node representations based on the attribute vectors, and then iteratively updates the node representations by aggregating, for each node, the node representations of its immediate neighbors into a neighborhood vector (using a suitable aggregation function), combining (e.g., concatenating) the neighborhood vector with the current node representation of the node at issue, and passing the combined vector through a dense neural network layer (e.g., represented by a weight matrix associated with the iteration) to compute the updated node representation. Over successive iterations, the node representations incorporate information from increasingly farther neighbor nodes. The updated representation after a specified number of iterations, also called the "depth" of the embedding, is returned as the final node embedding. The depth corresponds to the number of degrees of separation across which nodes affect the embeddings of their neighbors. More detail about GraphSAGE can be found, e.g., in "Inductive Representation Learning on Large Graphs" by W. Hamilton, R. Ying, and J. Lesokovect, published as arXiv:1706.02216. v4 (2018).

With renewed reference to FIG. 2, the graph embeddings of the nodes within the graph representation 154 of a given incident are aggregated into a thumbprint representation 158 of the incident (operation 210). In some embodiments, the incident thumbprint 158 is simply the sum or average of all node embeddings. In other embodiments, the nodes within the graph are clustered based on the embeddings, the number of nodes within each cluster is counted, and the counts for all clusters are then assembled into a vector that constitutes the thumbprint 158 of the incident. The clustering may be performed with any of a number of suitable clustering techniques known to those of skill in the art, for instance using k-means clustering. In brief, k-means clustering algorithms aim at partitioning the n nodes into k clusters in a way such that each node belongs to the cluster with the nearest cluster center, the cluster center being the mean of the positions of all node embeddings within the embedding space. Such clustering can be achieved, e.g., by a process of iterative refinement, where, starting from arbitrary initial cluster centers, in each iteration, nodes are assigned to the closest cluster, and the mean of node positions within the cluster is then updated based on the node assignments. In some embodiments, the node embeddings associated with the incident are clustered multiple times for different respective values of k (corresponding to different numbers of clusters), and the counts for each clustering are concatenated to form the thumbprint representation 158. For example, if clustering is performed for values of k=5, 10, and 20, the resulting thumbprint would be a 35-component vector containing the node counts of the clusters for all three clusterings.

The thumbprint representation 158 computed in operation 210 is used, in operation 212, to generate an output. The output may be a textual, visual, or other human-readable output provided to a user (such as a security analyst), e.g., via an electronic message or user interface, that includes information about the security incident 150 derived at least in part from the thumbprint representation 158; this information may aid the user in selecting a suitable mitigating action 170 or security policy 172. Alternatively or additionally, the output may be a mitigating action 170 or security policy 172 (or a signal triggering a mitigating action or setting a security policy) that is automatically selected based at least in part on the thumbprint representation 158. For example, if a security incident is found to be similar to a prior incident based on a comparison between their thumbprints, the same mitigating action(s) as applied for the prior incident may be automatically triggered. Similarly, if a security incident can be attributed to a particular threat actor, a set of mitigating actions specified for that threat actor based on prior experience may be initiated.

FIGS. 3A-3F are dataflow diagrams illustrating example methods of utilizing graph-based thumbprint representations 158 of security incidents 150 to generate output information (e.g., 162, 164, 166) and/or actions (e.g., 170, 172), in accordance with various embodiments.

Figures 3A, 3B, 3C:
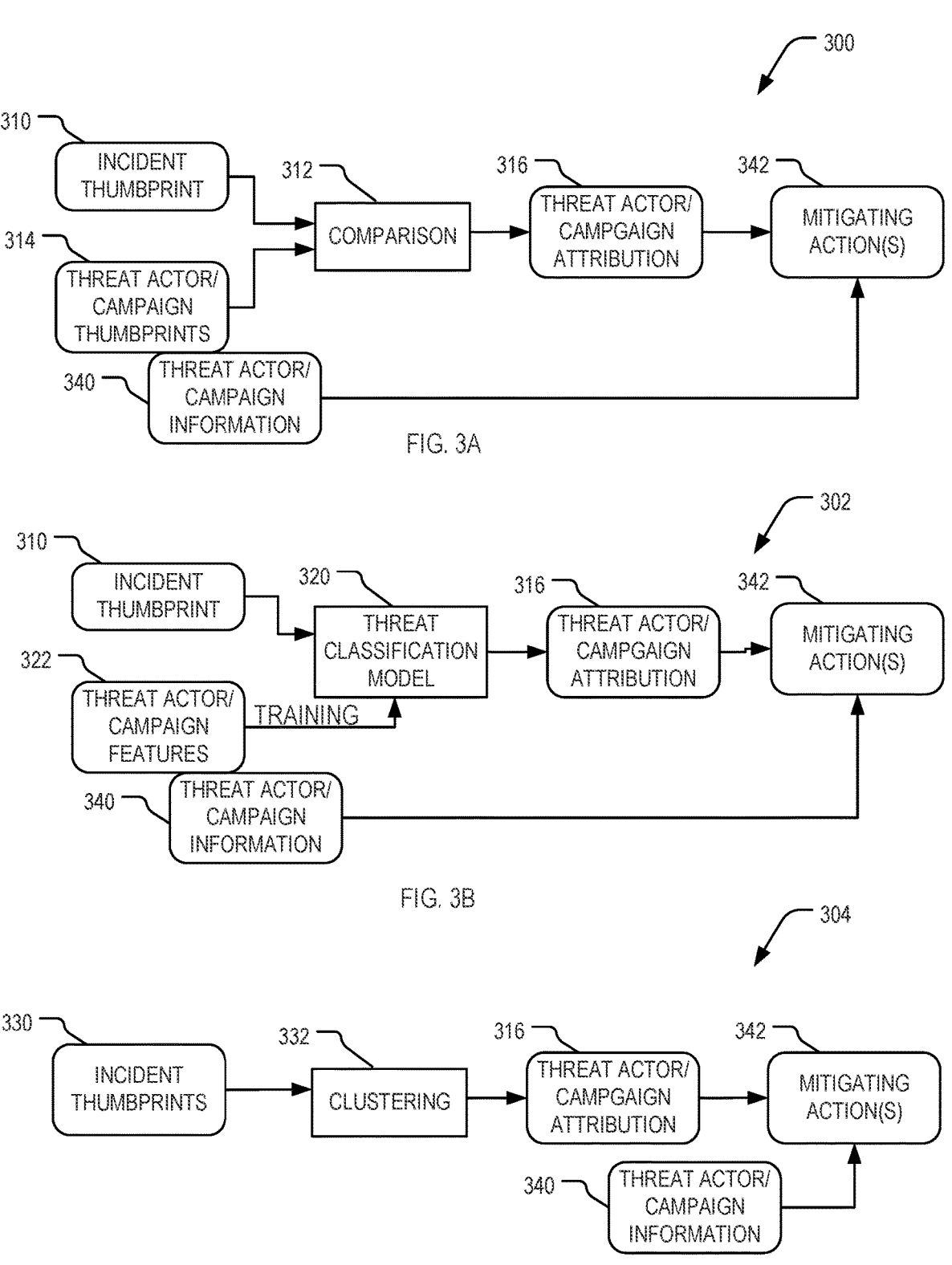
FIGS. 3A-3F are dataflow diagrams illustrating example methods of utilizing graph-based thumbprint representations of security incidents to generate output information and/or actions, in accordance with various embodiments.

FIGS. 3A-3C depict various dataflows 300, 302, 304 for attributing a security incident 150 to a known threat actor or threat campaign. In dataflow 300 of FIG. 3A, the thumbprint 310 of the security incident 150 at issue is compared, at 312, against a library of thumbprint representations 314 of threat actors/campaigns, e.g., using a suitable distance or similarity metric, such as the Cartesian distance or the cosine similarity, between the thumbprint at issue and the individual thumbprints in the library. The threat actor/campaign attribution 316 may then identify the threat actor/campaign whose thumbprint is the most similar to the thumbprint 310 of the security incident 150 as most likely responsible for the incident 150. FIG. 3B illustrates a slightly different dataflow 302 for threat-actor attribution, in which the thumbprint 310 of the security incident is fed as input into a threat classification model 320 that has been trained, based on labeled training data including features of threat actors/campaigns 322 (e.g., as stored in database 168), to recognize features within incident thumbprints 158 that are associated with different threat actors/campaigns. The classification model 320 may be, e.g., a contrastive loss model or feature difference model. The model 320 classifies incidents according to threat actor/campaign responsible for the incident, i.e., it outputs a threat actor/campaign attribution 316. Yet another approach to threat-actor attribution is shown in the dataflow 304 of FIG. 3C, where thumbprints 330 for a set of multiple security incidents are clustered, at 332, based on mutual similarity. Incidents that cluster together often share similar tactics, techniques, and procedures (TTPs) employed by the attacker. On that ground, if any of the incidents within a cluster has previously been attributed to a certain threat actor or campaign, that attribution is "inherited" by the other incidents within the cluster, that is, the threat actor/campaign is deemed also responsible for the other incidents. In the event that an initial cluster has incidents with inconsistent attribution, sub-clustering with a higher threshold of similarity may be performed. In any of dataflows 300, 302, 304, the threat actor/campaign attribution 316 may be used, in conjunction with information 340 about the threat actor/campaign, to automatically select set of mitigating actions 342 to be applied to the incident (or, in the case of FIG. 3C, the cluster of incidents). In fact, the information 340 may directly specify a security policy or set of mitigating actions for the identified threat actor/campaign, which may be automatically triggered in response to the threat actor/campaign attribution 316.

Figures 3D, 3E, 3F:
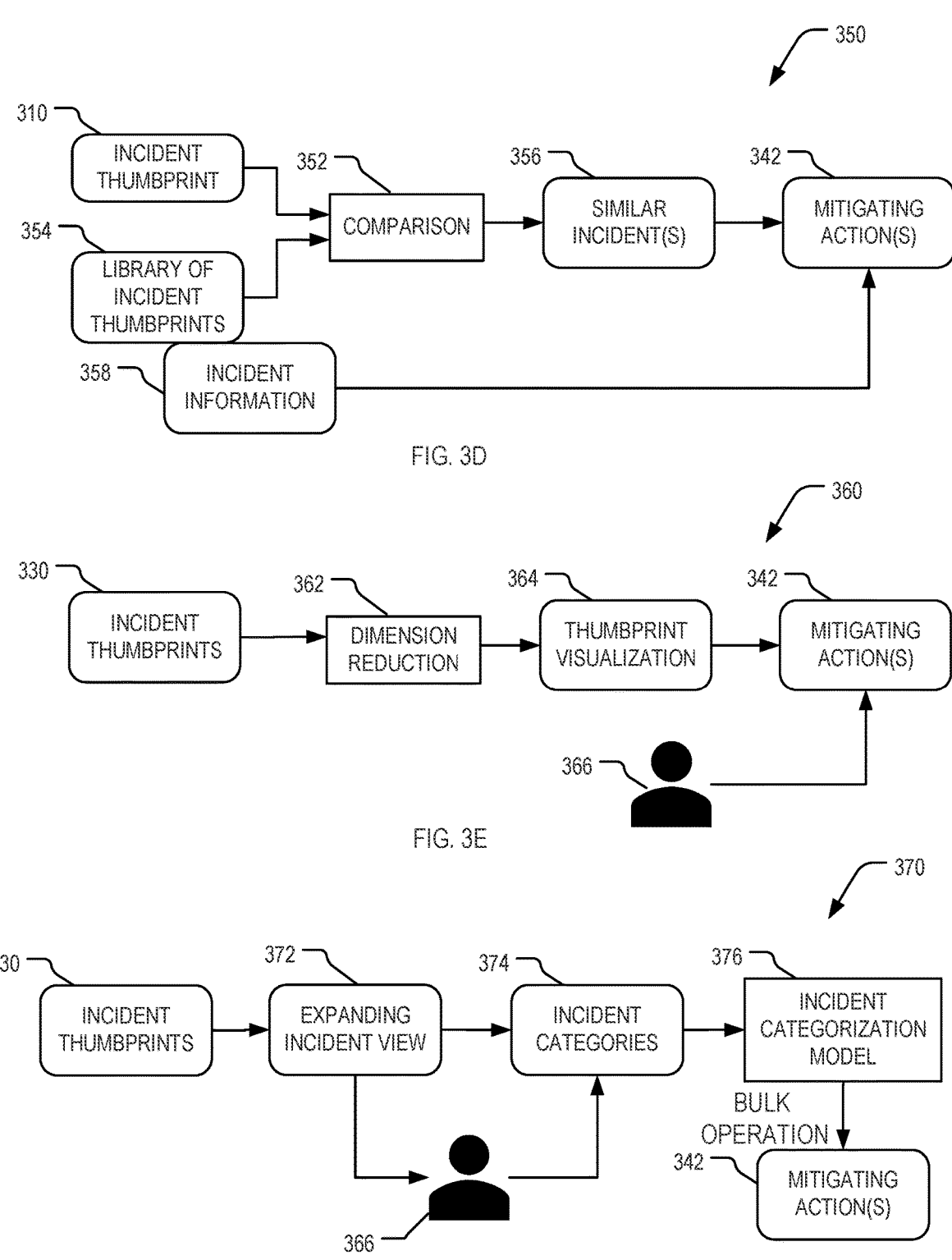

FIG. 3D illustrates a dataflow 350 for comparing, at 352, the thumbprint 310 of a given incident to a library of thumbprints of other security incidents, 354 (e.g., stored in incident thumbprint database 160), to identify one or more similar incidents 356, e.g., the top n most similar incidents. The comparison is based on a suitable distance or similarity metric, such as, e.g., the Cartesian distance or the cosine similarity, between the thumbprint 310 of the incident at issue and the individual thumbprints in the incident thumbprint library 354. The similar incident(s) 356 and associated information 358 (e.g., including mitigating actions previously taken in response to such similar incidents) may be provided to a security analyst to aid further processing of the incident at issue, and/or may automatically trigger mitigating actions 342 (e.g., such as actions used in response to prior, similar incidents).

FIG. 3E shows a dataflow 360 for visualizing multiple security incidents based at least in part on their thumbprints 330 in a graphical user interface that allows an analyst to interact with the displayed information. The thumbprints 330 may, for example, be projected onto a lower-dimensional (e.g., two-dimensional) space using a dimension reduction algorithm (362) such as, e.g., UMAP. Aided by this graphical representation or visualization 364, a security analyst 366 may then select and apply policies or mitigating actions (342) directly to incidents represented within the graph.

FIG. 3F illustrates a dataflow 370 for semi-supervised automation. Using the thumbprints 330 of the security incidents as a guide, an successively expanding view of similar incidents 372 is presented to a security analyst 366, who can respond to each newly presented incident, indicating whether that incident belongs to the same category as prior incidents. In this manner, groups of incidents defining incident categories 374 are formed, eventually allowing a categorization model 376 of security incidents to be built. Using this model 376, mitigating actions 342 can subsequently be applied as bulk operations to all incidents within a category.

In addition to the thumbprints 158 that represent security incidents 150 as a whole, the graph embeddings 156 of nodes and/or edges, from which the thumbprints are computed, may also be used directly to derive useful context and information. For instance, in some embodiments, node embeddings are compared across the incident graphs of multiple security incidents to identify nodes that, although originally assigned to clusters corresponding to different security incidents, turn out to be similar in terms of their embeddings. If a pair of nodes with similar embeddings belonging to two separate incidents is found, the graph representations of one or both of these incidents may be expanded by the addition of the similar node from the other incident. Optionally, the comparison between node embeddings from different incident graphs may be gated by some indicator of possible similarity, such as a shared associated entity (e.g., IP address) or other attribute.

Node embeddings may also be used, in some embodiments, to identify subgraphs of similar nodes within the graph representation of a given security incident. These subgraphs may pertain to important security context. For example, different subgraphs may be associated with different respective phases of an incident. Once the subgraphs have been determined, a closer review of the attributes of nodes within the subgraphs, e.g., by a security analyst, may enable ascertaining the respective associated phases. For example, different phases may have different associated predominant types of security events. The node embeddings may also be used to perform knowledge context learning on the subgraphs. For example, frequent subgraph mining techniques, as are known in the art, may be employed to determine subgraphs that appear more than a specified number of times in the original graph. Analyzed in the aggregate, the multiple instances of the same (or at least similar) subgraphs may be used to identify or inter TTPs or other security information. The learned context may be encoded into the graph (e.g., by adding new attributes or new types of nodes capturing the newly learned information), and updated embeddings may be computed (for the original graph as a whole or separately for the subgraphs). Based on the new embeddings, the subgraphs may be broken down further, and the process may repeat. During successive iterations of determining subgraphs, performing knowledge context learning, and updating the embedding, more and more context may be incorporated into the graph.

Edge embeddings may be utilized to infer missing or incomplete information on the graph. For example, given a semi-labeled graph, where some of the edges are labeled with attributes indicating the type of relationship (e.g., attacker-victim, beaconing), the graph may be augmented by assigning attributes to additional edges based on the similarity of their edge embeddings to the embeddings of labeled edges. Edge embeddings may also be used to predict missing nodes. This is, in a sense, the inverse of link prediction problems, where node embeddings are used to predict missing links (e.g., using pair-wise similarity between node embeddings). For example, reversible-jump Markov chain Monte Carlo methods may be used to iteratively expand the graph based on proposed missing information (e.g., an incorrectly configured security alert or a missing security product), or to predict the next action of an attacker.

Figure 4:
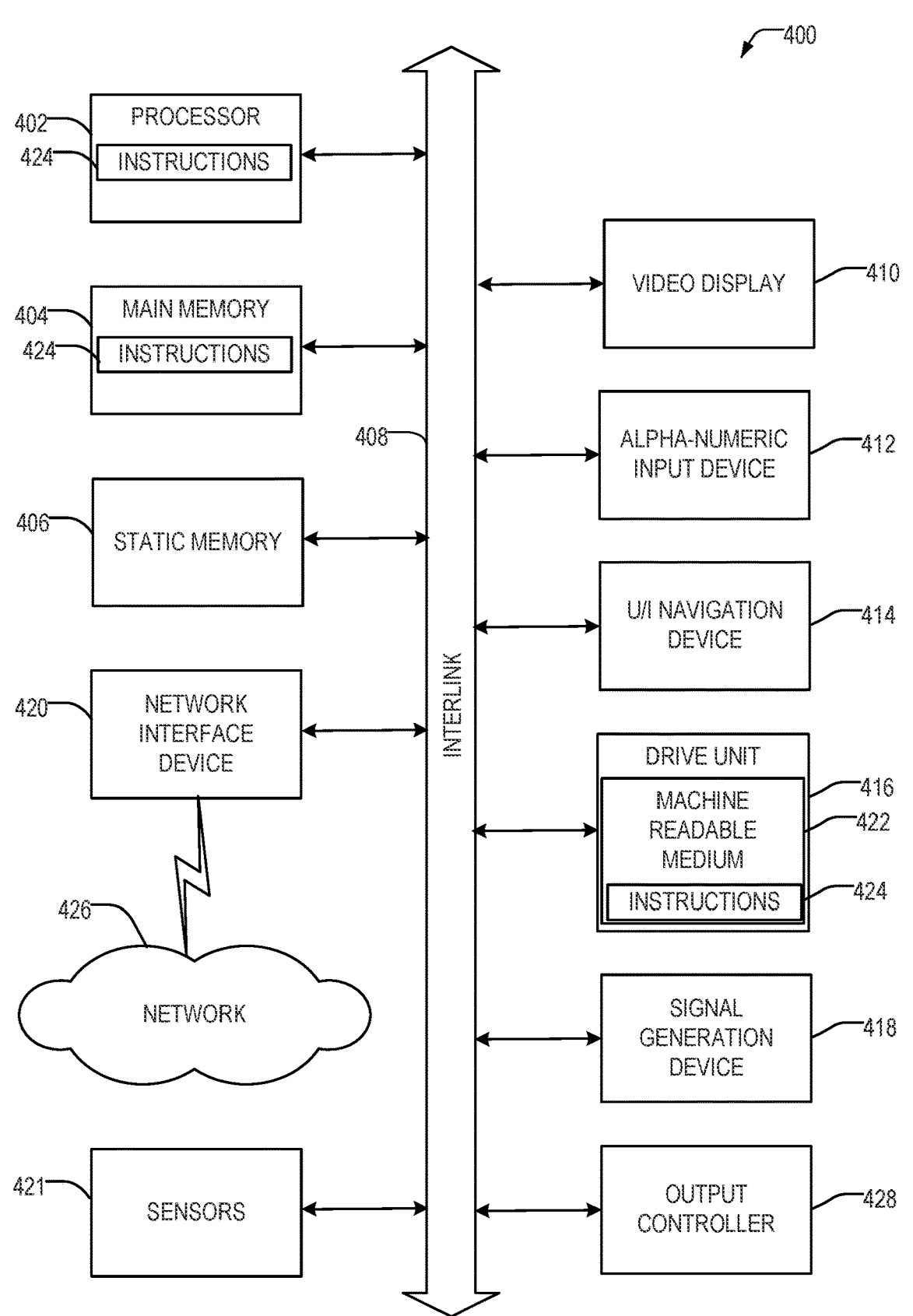
FIG. 4 is a block diagram of an example computing machine as may be used in implementing security incident monitoring and processing in accordance with various embodiments.

FIG. 4 illustrates a block diagram of an example machine 400 upon which any one or more of the techniques (e.g., methodologies) discussed herein may perform. In alternative embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environment. The machine 400 may be a personal computer (PC), a tablet PC, a set-top box (STB), a personal digital assistant (PDA), a mobile telephone, a smartphone, a web appliance, a network router, switch or bridge, a server computer, a database, conference room equipment, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. In various embodiments, machine(s) 400 may perform one or more of the processes described above with respect to FIGS. 1-3F above. For example, within the system 100 of FIG. 1, one or more machines 400 may implement any of computing machines 120, any of the security tools 102 for generating security events, and/or any of the components 130, 132, 134, 136, 138, 140 for processing the security events.

Machine (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The machine 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The machine 400 may include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 may include a machine-readable medium 422 on which are stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the machine 400. In an example, one or any combination of the hardware processor 402, the main memory 504, the static memory 406, or the storage device 416 may constitute machine-readable media.

While the machine-readable medium 422 is illustrated as a single medium, the term "machine-readable medium" may include a single medium or multiple media (e.g., a centralized or distributed database, and/or associated caches and servers) configured to store the one or more instructions 424.

The term "machine-readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine-readable media may include non-transitory machine readable media. In some examples, machine-readable media may include machine-readable media that are not a transitory propagating signal.

The instructions 424 may further be transmitted or received over a communications network 426 using a transmission medium via the network interface device 420. The machine 400 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), multiple-input multiple-output (MIMO), or multiple-input single-output (MISO) techniques. In some examples, the network interface device 820 may wirelessly communicate using Multiple User MIMO techniques.

Examples, as described herein, may include, or may operate on, logic or a number of components, modules, or mechanisms (all referred to hereinafter as "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The following numbered examples are illustrative embodiments.

Example 1 is a computer-implemented method that includes monitoring a computer network for security events; determining, among the security events based on correlations between their attributes, a group of correlated security events that collectively constitute a security incident; and processing the security incident. The processing involves generating a graph representation of the security incident that includes nodes representing the security events within the security incident and nodes representing security metadata associated with the security incident, computing graph embeddings of the nodes within the graph representation of the security incident, aggregating the graph embeddings of the nodes into a thumbprint representation of the security incident, and generating an output based on the thumbprint representation.

Example 2 is a computer-implemented method of processing a security incident including a plurality of security events by generating graph representation of the security incident that includes nodes representing the security events within the security incident and nodes representing security metadata associated with the security incident, computing graph embeddings of the nodes within the graph representation of the security incident, aggregating the graph embeddings of the nodes into a thumbprint representation of the security incident, and generating an output based on the thumbprint representation.

Example 3 is the method of example 1 or example 2, wherein the security metadata comprises entities involved in the security events and/or one or more insights associated with the security incident.

Example 4 is the method of any of examples 1-3, wherein generating the output involves identifying a threat actor and/or a threat campaign responsible for the security incident.

Example 5 is the method of example 4, wherein the threat actor and/or threat campaign responsible for the security incident is identified by grouping the security incident together with other security incidents based on similarity between their thumbprint representations, and identifying a threat actor or threat campaign previously determined to be responsible for one of the other security incidents as the threat actor or threat campaign responsible for the security incident at issue.

Example 6 is the method of example 4, wherein the threat actor and/or threat campaign is identified by passing the thumbprint representation as input to a classification model trained based on features of known threat actors or threat campaigns.

Example 7 is the method of any of examples 1-6, wherein generating the output includes identifying at least one other security incident having a thumbprint representations similar to the thumbprint representation of the security incident, and wherein information about the one or more other security incidents is included in the output.

Example 8 is the method of any of examples 1-7, wherein generating the output comprises clustering the security incidents based on similarity between the thumbprint representations, and wherein the output for each cluster of security incidents comprises one or more threat-mitigating actions applied as bulk operations to all security incidents within the cluster.

Example 9 is the method of any of examples 1-8, wherein generating the output includes projecting the thumbprint representations into a lower-dimensional representation space, and wherein the output includes a visualization, in a user interface, of the security incidents in the lower-dimensional representation space.

Example 10 is the method of example 9, further including receiving, from a user via the user interface, assignments of security policies to the security incidents.

Example 11 is the method of any of examples 1-10, further including comparing the graph embeddings of the nodes across multiple security incidents to identify similar nodes belonging to different ones of the security incidents, and expanding at last one of the security incidents by addition of at least one similar node from another one of the security incidents.

Example 12 is the method of any of examples 1-11, further including comparing the graph embeddings of the nodes within one of the security incidents to identify subgraphs of similar nodes.

Example 13 is the method of example 12, further including associating the subgraphs with respective phases within the incident.

Example 14 is the method of example 12 or example 13, further comprising performing knowledge context learning on the subgraphs, encoding learned context into the graph representation of the security incident, and computing updated graph embeddings of the nodes within the graph representations of the security incident.

Example 15 is the method of any of examples 1-14, further comprising computing graph embeddings of the edges between the nodes of the graph representations of the security incident, and augmenting the graph representation based on the graph embeddings of the edges.

Example 16 is the method of example 15, wherein at least some of the edges within the graph representation are labeled with attributes, and wherein augmenting the graph representation includes assigning attributes to additional edges based on similarity between the graph embeddings of the edges.

Example 17 is the method of example 15 or example 16, wherein augmenting the graph representation comprises adding nodes to the graph representation, the nodes predicted based at least in part on the graph embeddings of the edges.

Example 18 is the method of any of examples 1-17, wherein generating the output comprises causing performance of at least one threat-mitigating action selected among: suspending network accounts, sending warnings to network users, causing authentication credentials to be reset, isolating affected machines, preforming scans for malware, de-installing malware, removing a persistence mechanism associated with the security incident, backing up data, restoring destroyed data from back-up copies, identifying exfiltrated data, fixing security bugs, increasing a level of network traffic monitoring, and notifying authorities.

Example 19 is the method of any of examples 1-18, wherein the graph embeddings are computed using a graph representation learning technique.

Example 20 is computer system including one or more hardware processors and one or more machine-readable media storing instructions that, when executed by the hardware processor(s), cause the hardware processor(s) to perform operations for processing a security incident including multiple security events. The operations include generating a graph representation of the security incident that includes nodes representing the security events within the security incident and nodes representing security metadata associated with the security incident, computing graph embeddings of the nodes within the graph representation of the security incident, aggregating the graph embeddings of the nodes into a thumbprint representation of the security incident, and generating an output based on the thumbprint representation.

Example 21 is the computer system of example 20, wherein the operations implement any of the methods of examples 1-19, Example 22 is a non-transitory machine-readable medium, or set of multiple non-transitory machine-readable media, storing instructions that, when executed by one or more hardware processors, cause the hardware processor(s) to perform operations for processing a security incident comprising multiple security events. The operations include generating a graph representation of the security incident that includes nodes representing the security events within the security incident and nodes representing security metadata associated with the security incident, computing graph embeddings of the nodes within the graph representation of the security incident, aggregating the graph embeddings of the nodes into a thumbprint representation of the security incident, generating an output based on the thumbprint representation.

Example 23 is the machine-readable medium or media of example 22, wherein the operations implement any of the methods of examples 1-19.

Although embodiments have been described with reference to specific example embodiments, it will be evident that various modifications and changes may be made to these embodiments without departing from the broader scope of the invention. Accordingly, the specification and drawings are to be regarded in an illustrative rather than a restrictive sense. The accompanying drawings, which form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This description, therefore, is not to be taken in a limiting sense, and the scope of various embodiments is defined only by the appended claims, along with the full range of equivalents to which such claims are entitled.

What is claimed is:

1. A computer-implemented method comprising:
monitoring a computer network for security events;
determining, among the security events based on correlations between their attributes, a group of correlated security events that collectively constitute a security incident;
generating a graph representation of the security incident, the graph representation comprising nodes representing the security events within the security incident and nodes representing security metadata associated with the security incident;
computing graph embedding vectors of the nodes within the graph representation of the security incident;
determining from the graph embedding vectors of the nodes, aggregated over the graph representation of the security incident, a thumbprint representation of the security incident by: clustering the nodes within the graph representation based on the graph embedding vectors to create clusters, determining node counts for the nodes within the clusters, and assembling the node counts for all of the clusters into the thumbprint representation; and
generating an output based on the thumbprint representation.

2. The method of claim 1, wherein the security metadata comprises at least one of entities involved in the security events or an insight associated with the security incident.

3. The method of claim 1, wherein generating the output comprises identifying at least one of a threat actor or a threat campaign responsible for the security incident.

4. The method of claim 3, wherein identifying the threat actor or threat campaign responsible for the security incident comprises grouping the security incident together with other security incidents based on similarity between their thumbprint representations, and identifying a threat actor or threat campaign previously determined to be responsible for one of the other security incidents as the threat actor or threat campaign responsible for the security incident.

5. The method of claim 3, wherein identifying the threat actor or threat campaign comprises passing the thumbprint representation as input to a classification model trained based on features of known threat actors or threat campaigns.

6. The method of claim 1, wherein generating the output comprises identifying at least one other security incident having a thumbprint representations similar to the thumbprint representation of the security incident, and wherein the output comprises information about the one or more other security incidents.

7. The method of claim 1, wherein generating the output comprises clustering the security incidents based on similarity between the thumbprint representations, and wherein the output for each cluster of security incidents comprises one or more threat-mitigating actions applied as bulk operations to all security incidents within the cluster.

8. The method of claim 1, wherein generating the output comprises projecting the thumbprint representations into a lower-dimensional representation space, and wherein the output comprises a visualization, in a user interface, of the security incidents in the lower-dimensional representation space.

9. The method of claim 8, further comprising receiving, from a user via the user interface, assignments of security policies to the security incidents.

10. The method of claim 1, further comprising comparing the graph embedding vectors of the nodes across multiple security incidents to identify similar nodes belonging to different ones of the security incidents, and expanding at last one of the security incidents by addition of at least one similar node from another one of the security incidents.

11. The method of claim 1, further comprising comparing the graph embedding vectors of the nodes within one of the security incidents to identify subgraphs of similar nodes.

12. The method of claim 11, further comprising associating the subgraphs with respective phases within the incident.

13. The method of claim 11, further comprising performing knowledge context learning on the subgraphs, encoding learned context into the graph representation of the security incident, and computing updated graph embedding vectors of the nodes within the graph representations of the security incident.

14. The method of claim 1, further comprising computing graph embedding vectors of the edges between the nodes of the graph representation of the security incident, and augmenting the graph representation based on the graph embeddings of the edges.

15. The method of claim 14, wherein at least some of the edges within the graph representation are labeled with attributes, and wherein augmenting the graph representation comprises assigning attributes to additional edges based on similarity between the graph embeddings of the edges.

16. The method of claim 14, wherein augmenting the graph representation comprises adding nodes to the graph representation, the nodes predicted based at least in part on the graph embedding vectors of the edges.

17. The method of claim 1, wherein generating the output comprises causing performance of at least one threat-mitigating action selected among: suspending network accounts, sending warnings to network users, causing authentication credentials to be reset, isolating affected machines, preforming scans for malware, de-installing malware, removing a persistence mechanism associated with the security incident, backing up data, restoring destroyed data from back-up copies, identifying exfiltrated data, fixing security bugs, increasing a level of network traffic monitoring, and notifying authorities.

18. A computer system, comprising:
at least one hardware processor; and
at least one machine-readable medium storing instructions that, when executed by the at least one hardware processor, cause the at least one hardware processor to perform operations for processing a security incident comprising multiple security events, the operations comprising:

generating a graph representation of the security incident, the graph representation comprising nodes representing the security events within the security incident and nodes representing security metadata associated with the security incident;

computing graph embedding vectors of the nodes within the graph representation of the security incident;

determining from the graph embedding vectors of the nodes, aggregated over the graph representation of the security incident, a thumbprint representation of the security incident by: clustering the nodes within the graph representation based on the graph embedding vectors to create clusters, determining node counts for the nodes within the clusters, and assembling the node counts for all of the clusters into the thumbprint representation; and generating an output based on the thumbprint representation.

19. One or more non-transitory machine-readable media storing instructions that, when executed by at least one hardware processor, cause the at least one hardware processor to perform operations for processing a security incident comprising multiple security events, the operations comprising:

generating a graph representation of the security incident, the graph representation comprising nodes representing the security events within the security incident and nodes representing security metadata associated with the security incident;

computing graph embedding vectors of the nodes within the graph representation of the security incident;

determining from the graph embedding vectors of the nodes, aggregated over the graph representation of the security incident, a thumbprint representation of the security incident by:

clustering the nodes within the graph representation based on the graph embedding vectors to create clusters, determining node counts for the nodes within the clusters, and assembling the node counts for all of the clusters into the thumbprint representation; and generating an output based on the thumbprint representation.

\* \* \* \* \*